(12) United States Patent
Lomerson, Jr. et al.

(10) Patent No.: US 8,684,434 B2
(45) Date of Patent: Apr. 1, 2014

(54) END EFFECTOR WITH INTERNAL VALVE

(75) Inventors: Roland Lomerson, Jr., Lakewood Ranch, FL (US); Michael W. Norton, Richmond, VA (US)

(73) Assignee: AMF Automation Technologies, LLC, Richmond, VA (US)

( * ) Notice: Subject to any disclaimer, the term of this patent is extended or adjusted under 35 U.S.C. 154(b) by 168 days.

(21) Appl. No.: 13/287,184

(22) Filed: Nov. 2, 2011

(65) Prior Publication Data

US 2013/0106126 A1　　May 2, 2013

(51) Int. Cl.
*B66C 1/02*　　(2006.01)
(52) U.S. Cl.
USPC .............................. 294/186; 294/189; 901/40
(58) Field of Classification Search
USPC ..................... 294/183–186, 189, 65; 901/40
See application file for complete search history.

(56) References Cited

U.S. PATENT DOCUMENTS

| | | | | |
|---|---|---|---|---|
| 2,903,290 A | * | 9/1959 | Morris et al. | 294/65 |
| 2,916,059 A | * | 12/1959 | Wong | 141/65 |
| 3,013,833 A | * | 12/1961 | Gwin et al. | 294/65 |
| 3,523,707 A | * | 8/1970 | Roth | 294/65 |
| 3,558,171 A | * | 1/1971 | Netsch et al. | 294/186 |
| 3,934,916 A | * | 1/1976 | Baker | 294/189 |
| 4,078,671 A | * | 3/1978 | Lundstrom | 414/627 |
| 4,185,814 A | * | 1/1980 | Buchmann et al. | 271/108 |
| 4,355,936 A | | 10/1982 | Thomas et al. | |
| 4,787,812 A | | 11/1988 | Gopfert | |
| 4,850,627 A | | 7/1989 | Franklin | |
| 5,024,575 A | | 6/1991 | Anderson | |
| 5,088,878 A | | 2/1992 | Focke et al. | |
| 5,207,467 A | * | 5/1993 | Smith | 294/185 |
| 5,297,830 A | * | 3/1994 | Hoke | 294/65 |
| 5,344,202 A | * | 9/1994 | Ramler et al. | 294/188 |
| 5,609,377 A | | 3/1997 | Tanaka | |
| 5,752,729 A | | 5/1998 | Crozier et al. | |
| 5,813,713 A | | 9/1998 | Van Den Bergh | |
| 6,517,050 B1 | * | 2/2003 | Pabst | 251/339 |
| 6,860,531 B2 | | 3/2005 | Sherwin | |
| 7,000,964 B1 | * | 2/2006 | Porras et al. | 294/186 |
| 7,134,833 B2 | | 11/2006 | de Koning | |
| 7,648,182 B2 | | 1/2010 | Salimkhan | |
| 7,665,949 B2 | * | 2/2010 | Pearce | 414/627 |
| 7,828,351 B2 | | 11/2010 | Baumstimler | |
| 7,950,708 B2 | | 5/2011 | Parnell | |
| 8,251,415 B2 | * | 8/2012 | Lomerson, Jr. | 294/2 |
| 2008/0003092 A1 | | 1/2008 | Baclija et al. | |
| 2011/0254298 A1 | | 10/2011 | Lomerson, Jr. | |

OTHER PUBLICATIONS

M-420iA/M-421iA, Fanuc Robotico Brochure 2007, 10 pages.

* cited by examiner

*Primary Examiner* — Paul T Chin
(74) *Attorney, Agent, or Firm* — Thomas/Horstemeyer, LLP

(57) ABSTRACT

A valve 28 is positioned in the upper portion of the interior space of the bellows 10. A flow of low pressure air is induced inside the bellows when the valve elements 40 move away from the air inlet openings 38. When high pressure air is moved into the central portion of the valve housing 30, the valve elements 40 tend to move radially outwardly to block the air passages 38 and 42, thereby terminating the suction applied to the bellows.

14 Claims, 2 Drawing Sheets

END EFFECTOR WITH INTERNAL VALVE

FIELD OF THE INVENTION

This disclosure concerns robotic packaging devices that include an end effector that can be used for collecting work products of different shapes and sizes, usually for placing the products in different patterns into a receptacle, such as a shipping container.

BACKGROUND OF THE DISCLOSURE

When placing work products in a shipping container, it is desirable to place several work products at a time in the container and, in some instances, the work products must be collected in a desired pattern of the products for fitting into the container of a specific size and shape.

For example, in the bakery industry a producer typically will produce several sizes of loaves of bread from time to time and has one type of shipping container in which the products are to be packed and shipped. Because different ones of the products may be different in size and shape from time to time, the products may fit best in the shipping container when the products are configured in different arrangements, or "pack patterns," than other sized products. The pack patterns may be dependent upon the product sizes.

A robot may be used to pick the products up with multiple picks of the end effector at various positions of the end effector to form the desired pack pattern for the particular shipping container. The robot then places the products into the shipping container all at once, in the desired pattern.

The end effector that is used to pick and place products typically will use multiple suction cups that are used as vacuum retrievers to provide the seal between the vacuum source and the objects being picked. When multiple picks are required for one delivery of the products to the shipping container, the vacuum must be applied to certain ones of the suction cups on the end effector to enable picking or holding the product in that pick zone while the other zones of the suction surface must not allow vacuum flow because those zones of the end effector are not yet covered by work products. To accomplish this, the vacuum source may be applied in several suction cups, and the suction cups are then applied to the work product. The suction cups that are not in communication with the vacuum source cannot pick the work products in that picking zone.

It is desirable to have the end effector in a compact, low profile and to employ the smallest number of components necessary for the end effector to achieve its functions.

Usually, a single vacuum source is applied to the end effector, and the end effector controls the application of the sub-atmospheric pressure to the suction cups.

Additional information concerning end effectors for robots may be found in U.S. Pat. No. 7,950,708. The disclosure in said patent concerning programmable zoned end effectors is adopted herein in its entirety by reference.

End effectors having vacuum charged suction cups are used to pick and place work products that have loose outer coverings, such as loaves of sliced bread in a plastic bag, so that when the vacuum of a suction cup is applied to the work product, it tends to lift the plastic bag and the plastic bag, in turn, lifts the product inside the plastic bag. This generally tends to separate the upper portion of the plastic bag from the work product, causing a portion of the plastic bag to be lifted up to the interior of the suction cup. This is not desirable in that it sometimes stretches the plastic bags and may even rupture the plastic bags while the work product is attached to the end effector. Also, the shreds of plastic and film that are separated from the plastic bags during the application of the vacuum to the bags tends to move into the suction cup, through the air flow system, including the valves, the low pressure air plenum, etc., requiring these and other components of the equipment to be cleaned so as to maintain the function and durability of the component parts of the system.

SUMMARY OF THE DESCRIPTION

Briefly described, one form of the technology described herein is an end effector for mounting to a robotic arm and for engaging and transporting a work product. The end effector may include a multiple bellows or other type suction cup that includes a side wall defining an interior space, an open end for engaging the work product, and a mounting end opposite to the open end for mounting to a robotic arm. An air control valve is positioned in the interior space of each bellow. Each air control valve may include a valve housing with a bottom wall facing the open end of the bellows, a side wall connected to the bottom wall, and a top wall for connection to the mounting end of the bellows. The bottom wall, side wall and top wall define a valve chamber, and the valve chamber defines at least one valve air inlet opening. A valve element for each valve inlet opening is positioned in the valve chamber for registration with the valve inlet openings for blocking movement of air from the interior space of the bellows into the valve chamber.

The valve elements may be ball valves. The bottom wall of the valve housing may be impervious to the movement of air from the interior space of the bellows into the valve chamber. The bottom wall forms a ceiling to the interior space of the bellows so that the plastic bag or other flexible container for the work product may bear against the bottom wall, thereby avoiding overly stretching the plastic bag.

The open end of the bellows is sized so as to retract to a predetermined distance displaced from the valve such that the work products engaged and transported by the bellows likely will not engage the valve. However, the bottom surface of the valve housing may be impervious to the passage of air so that in the event that the plastic wrapper of the work product is stretched upwardly into the interior space of the bellows, it will engage only the impervious surface of the valve housing and will avoid blocking the air passages of the bellows.

The top wall of the valve housing may define a low pressure air outlet opening for communication with air at a pressure lower than atmospheric air, and defines a high pressure air inlet opening for communication with air pressure higher than atmospheric air. These two air pressures are used to manipulate the valve balls, ultimately opening and closing the valve openings.

Other objects, features, and advantages will become apparent upon reviewing the following specification and drawings, and as described in more detail in the accompanying claims.

DETAILED DESCRIPTION

Figure 1:
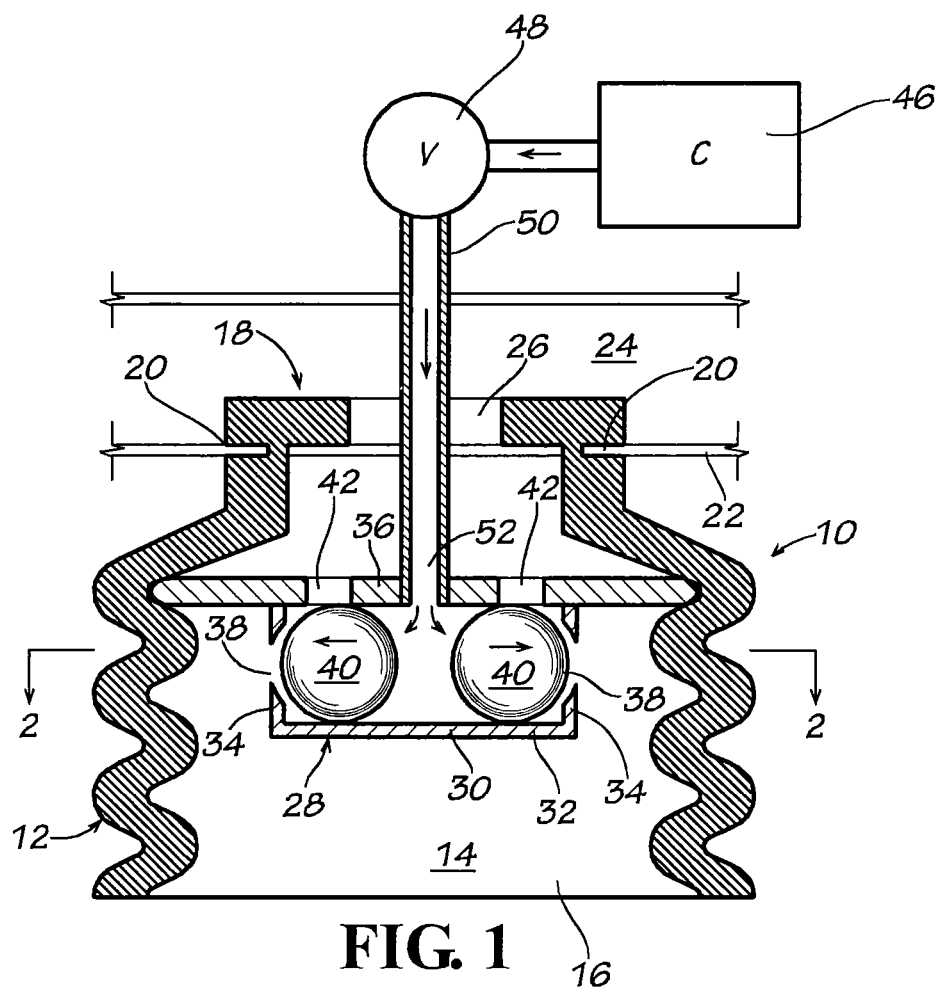
FIG. 1 is a side cross sectional view of one of the bellows of an end effector, showing the valve in its closed position.
Figure 2:
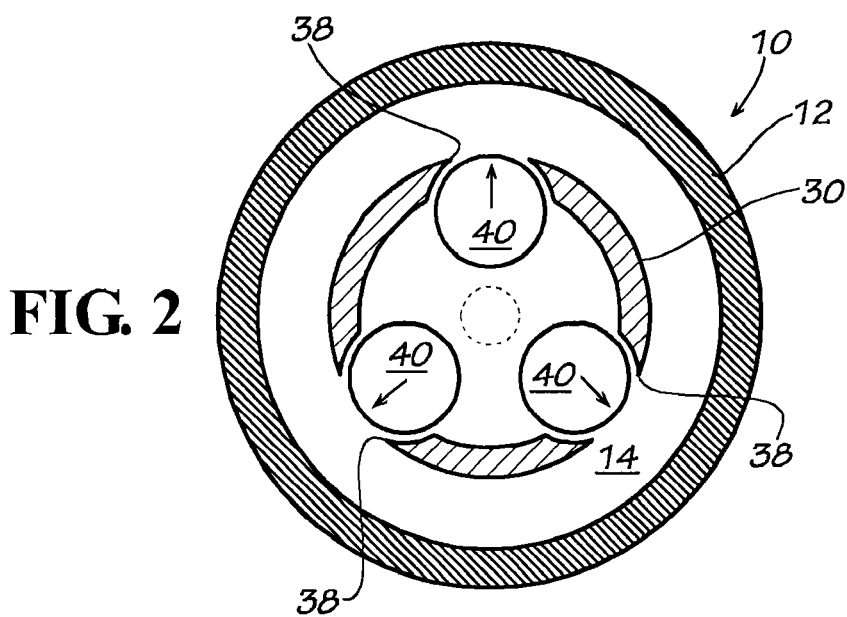
FIG. 2 is a plan view in cross section, taken along lines 2-2 of FIG. 1.

Referring now in more detail to the drawings, in which like numerals indicate like parts throughout the views, FIG. 1 illustrates a bellows 10 and includes a circular side wall 12 that is formed in a series of vertically spaced circular ribs. The side wall of the bellows defines an interior space 14, having an open end 16 for engaging work products and a mounting end 18 opposite to said open end for mounting to the vacuum plenum 24.

The mounting end 18 of the bellows includes a circular outwardly facing groove 20 that is mounted about a circular opening in the panel 22 of a vacuum plenum 24. A low air pressure outlet opening 26 is formed in the mounting end 18 of the bellows. It allows the interior space 14 of the bellows to communicate with the vacuum air in the vacuum plenum 24.

A valve 28 is positioned in the interior space 14 of the bellows 10. Valve 28 includes a valve housing 30 that has a bottom wall 32, a circular side wall 34, and a top wall 36. At least one, preferably three vacuum air inlet openings 38 are formed in the circular side wall 34, typically at 120° intervals about the circular side wall so that the air inlet openings are equally spaced about the circular side wall 34.

Top wall 36 of valve housing 30 may be of a larger diameter than bottom wall 32 and its perimeter reaches radially outwardly into engagement with the interior surface of the side wall 12 of bellows 10. The protrusion of the top wall into the outwardly extending recess of the bellows side wall tends to hold the valve housing 30 in its position as illustrated in FIG. 1.

Valve housing 30 includes valve elements 40 which are spherically shaped and which rest freely on the upwardly facing surface of the bottom wall 32 of valve housing 30.

Top wall 36 of valve housing 30 defines vacuum air outlet openings 42 that extend between the interior of valve housing 30 and the space above the top wall 36 of the valve housing 30.

A source of high air pressure 46, such as a compressor and a high air pressure plenum (not shown), communicate through a valve 48 for each bellows, then through conduit 50 that extends through the low air pressure plenum 24, to a central high air pressure opening 52 in the top wall 36 of valve housing 30. The source of high air pressure 46 may originate from a high pressure plenum (not shown) or other conventional means. Likewise, the conduits and valves 48 for each bellows are of conventional construction and available in various forms.

Operation

FIG. 1 shows the bellows with its valve 28 in its inoperative condition, with air pressure higher than atmospheric air pressure moving through conduit 50 downwardly through the mounting end 18 of the bellows 10 into the interior of valve housing 30, as illustrated by the downwardly extending arrows in FIG. 1. The high pressure imposed in the interior of the valve housing 30 urges the valve elements 40 radially outwardly toward registration with the lower pressure of the air inlet openings 38, as shown by the arrows in FIG. 1, and into alignment with the air outlet openings 42 in the top wall 36 of the valve housing 30. This places the valve elements 40 of valve housing 30 in substantially closed relationships with both the vacuum air inlet openings 38 and the vacuum air outlet openings 42.

When in this condition, the bellows becomes dormant since there is very little vacuum in communication with the interior space 14 of the bellows.

Preferably, the valve elements 40 will not make a complete seal of the high pressure air inlet openings 38 so that a small air leakage around the valve elements 40 and outwardly through the air inlet openings will be established. Likewise, the valve elements 40 will only partially block air outlet openings 42 in the top wall 36, also maintaining a small stream of high pressure air upwardly through the air outlet openings 42. This continuous flow of air tends to assure that the valve housing 30, its openings 38 and 42, and the valve elements will become "self-cleaning," removing debris that might otherwise accumulate in such a valve.

Figure 3:
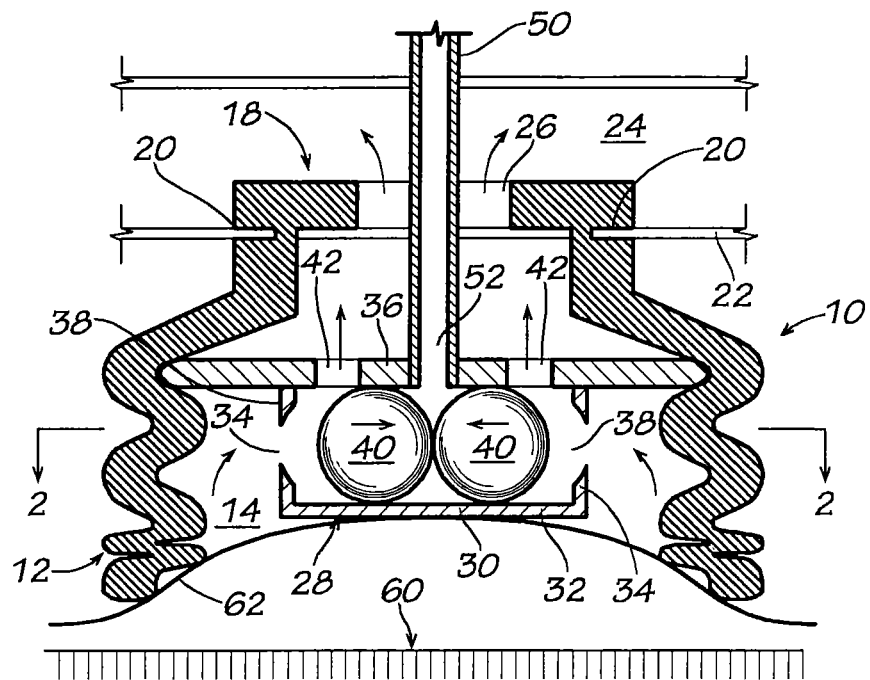
FIG. 3 is a side cross sectional view of the bellows of FIG. 1, but showing its valve in the open position.
Figure 4:
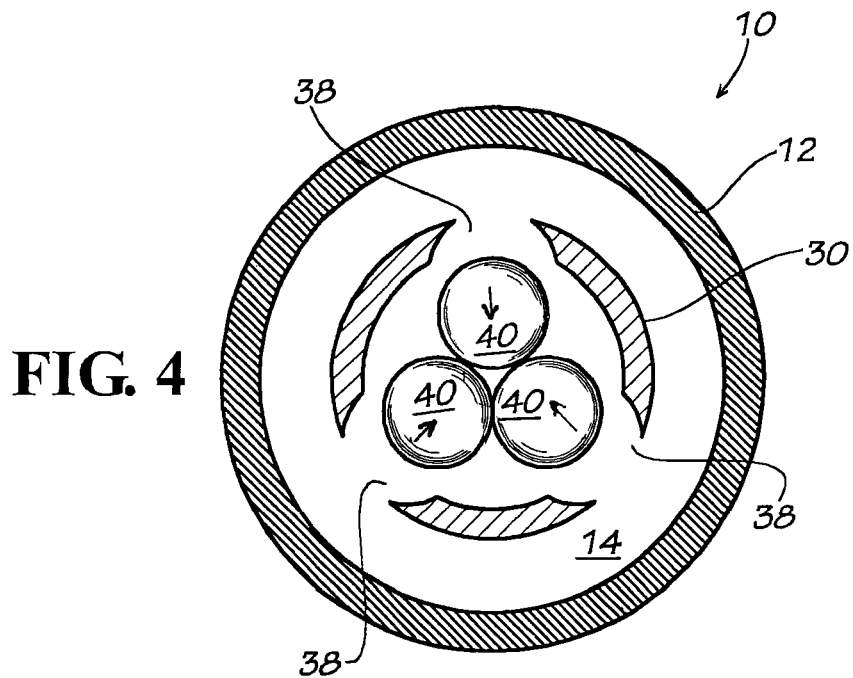
FIG. 4 is a plan view in cross section, taken along lines 4-4 of FIG. 3.

FIGS. 3 and 4 show the bellows in its active condition, whereby the low pressure air in the low air pressure plenum 24 draws air from the atmosphere upwardly through the bellows 10. This happens when the valve 48 (FIG. 1) closes so as to terminate the flow of high pressure air from its source 46. The continuous exposure of the bellows to the low air pressure plenum 24 through low air pressure outlet opening 26 reverses the positions of the valve elements 40, as shown by the arrows in FIG. 3. The continuous inducement of air flow by the low air pressure plenum 24 tends to evacuate air from the interior space 14 of the bellows, with the air flowing through the air inlet openings 38 of the circular side wall 34, then upwardly through the air outlet openings 42 in top wall 36, and finally through the low air pressure outlet opening 26 of the mounting end 18 of the bellows.

It will be noted from FIGS. 3 and 4 that the valve elements 40 tend to be drawn toward each other, toward the center of the valve housing 30, thereby moving out from beneath the air outlet openings 42 of the top wall 36. This opens the passages of air from the interior space 14 of the bellows 10, upwardly into the low air pressure plenum 24.

FIG. 3 also illustrates the work product 60 below the valve 28 that includes a wrapper 62. For example, the work product may be a loaf of bread 60 and the wrapper 62 may be the flexible plastic sheet material that contains the work product. It will be noted that the low air pressure in the interior space 14 of the bellows tends to lift the wrapper 62 away from the work product 60. In most cases, this will not be a significant removal of the wrapper from the work product. However, in some instances where the wrapper is loosely applied to the work product, the wrapper may be sucked upwardly inside the bellows to the point that it becomes engaged with the downwardly facing surface of the bottom wall 32 of the valve housing 30. Since the bottom wall 32 is impervious to the movement of air therethrough, the wrapper 62 tends to engage the bottom wall 32 and move no farther in a vertical direction. This tends to limit the "pull" of the wrapper away from the work product 60.

Since air inlet openings 38 in the side wall 34 face laterally away from the work product 60 and its wrapper 62, it is unlikely that the wrapper 62 would reach the air inlet openings 38 of the valve housing 30, thereby avoiding blockage of the air inlet openings 38.

FIG. 1 illustrates how the flow of air pressure tends to function as a cleaning means for removing debris from the valve housing, etc. It will be noted that in FIG. 3 a similar flushing of air through the valve housing 30 is present when the valve elements 40 have been moved away from the openings 38 and 42 of the valve housing.

Although a preferred embodiment of the invention has been disclosed as a bellows, it should be understood that the invention may comprise other types of suction cups and that the term "bellows" is to be construed as including flexible suction cups. It will be obvious to those skilled in the art that variations and modifications of the disclosed embodiment can be made without departing from the spirit and scope of the invention as set forth in the following claims.

What is claimed is:

1. An end effector for mounting to a robotic arm for engaging and transporting a work product, comprising a plurality of bellows supported by said end effector, each said bellows including a side wall defining an interior space, an open end for engaging a work product, and a mounting end opposite to said open end for communication with a vacuum plenum, a valve positioned in said interior space of each of said bellows, said valve including a valve housing with a bottom wall facing said open end of said bellows, a side wall connected to said bottom wall, and a top wall for connection to said mounting end of said bellows, said bottom wall, side wall and top wall defining a valve chamber, said side wall of said valve housing defining at least one valve opening, and at least one valve element positioned in said valve chamber for registration with said at least one valve opening for blocking movement of air from said interior space of said bellows into said valve chamber.

2. The end effector of claim 1, wherein said at least one valve element comprises a ball valve element.

3. The end effector of claim 1, wherein said bottom wall of said valve housing is impervious to the movement of air.

4. The end effector of claim 1, wherein said at least one valve opening comprises a plurality of valve openings, and said at least one valve element comprises a valve element for each said valve opening.

5. The end effector of claim 1, wherein said at least one valve element is a pressure activated valve.

6. The end effector of claim 1, wherein said at least one valve element is selected from a ball, a leaf and a plug.

7. The end effector of claim 1, wherein said top wall of said valve housing defines a low pressure air outlet opening for communication with air at a pressure lower than atmospheric air, and defines a high pressure air inlet opening for communication with air at a pressure higher than atmospheric air.

8. The end effector of claim 7, wherein said valve chamber is configured for moving said at least one valve element toward said at least one valve opening in response to high pressure air entering said valve housing through said high pressure air inlet opening.

9. The end effector of claim 7, and further including a low air pressure plenum in communication with said low pressure outlet opening for drawing air from said interior space of said bellows.

10. The end effector of claim 3, wherein said bottom wall of said valve housing is displaced from said open end of said bellows a distance such that the open end of said bellows cannot contract to the level of said bottom wall of the valve housing during operation of said bellows.

11. An end effector for mounting to a robotic arm for engaging and transporting a work product, comprising a plurality of bellows, each said bellows including a side wall defining an interior space, an open end for engaging a work product, and a mounting end opposite to said open end for communicating with a vacuum plenum, a valve positioned in said interior space of each of said bellows, said valve including a valve housing defining a valve chamber, at least one laterally facing air inlet opening formed in said valve housing between said interior space of said bellows and said valve chamber for admitting air from said interior space of said bellows into said valve chamber, and at least one upwardly facing air outlet opening formed in said valve housing for exhausting air out of said valve housing to the vacuum plenum, and a valve element for each laterally facing air inlet opening movable in said valve chamber to simultaneously block both said at least one laterally facing air inlet opening and said at least one upwardly facing air outlet opening.

12. The end effector of claim 11, wherein said valve housing further includes an upwardly facing air inlet opening for passing gas at a higher pressure than atmospheric air pressure into said valve housing for moving said at least one valve element to simultaneously block both said at least one laterally facing air inlet opening and said at least one upwardly facing air outlet opening.

13. The end effector of claim 12, wherein said at least one laterally facing air inlet opening comprises a plurality of air inlet openings.

14. The end effector of claim 11, wherein said open end of said bellows is configured to retract to a predetermined distance spaced from said valve such that the work products engaged and transported by said bellows does not engage said valve.

\* \* \* \* \*